(12) United States Patent
MacInnis

(10) Patent No.: US 8,325,273 B2
(45) Date of Patent: Dec. 4, 2012

(54) SYSTEM AND METHOD FOR VERTICAL GRADIENT DETECTION IN VIDEO PROCESSING

(75) Inventor: Alexander MacInnis, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 2139 days.

(21) Appl. No.: 11/270,999

(22) Filed: Nov. 10, 2005

(65) Prior Publication Data

US 2006/0274196 A1 Dec. 7, 2006

Related U.S. Application Data

(60) Provisional application No. 60/687,674, filed on Jun. 6, 2005.

(51) Int. Cl.
 *H04N 7/01* (2006.01)
 *H04N 11/20* (2006.01)
 *H04N 5/21* (2006.01)
 *H04N 9/64* (2006.01)

(52) U.S. Cl. ........ 348/448; 348/452; 348/628; 348/700; 348/701

(58) Field of Classification Search .............. 348/448, 348/452, 628, 700, 701
See application file for complete search history.

(56) References Cited

U.S. PATENT DOCUMENTS

| | | | | |
|---|---|---|---|---|
| 5,093,721 A * | 3/1992 | Rabii | ............................ | 348/448 |
| 5,661,525 A * | 8/1997 | Kovacevic et al. | ............ | 348/452 |
| 6,097,847 A * | 8/2000 | Inoue | ............................ | 382/266 |
| 6,181,382 B1 * | 1/2001 | Kieu et al. | ..................... | 348/459 |
| 6,331,874 B1 * | 12/2001 | de Garrido et al. | ........... | 348/452 |
| 6,421,090 B1 * | 7/2002 | Jiang et al. | ..................... | 348/452 |
| 6,618,094 B1 * | 9/2003 | De Haan et al. | .............. | 348/448 |
| 6,788,353 B2 * | 9/2004 | Wredenhagen et al. | ...... | 348/581 |
| 6,927,801 B2 * | 8/2005 | Yugami et al. | ................ | 348/458 |
| 7,023,487 B1 * | 4/2006 | Adams | .......................... | 348/448 |
| 7,039,254 B1 * | 5/2006 | Maenaka et al. | .............. | 382/300 |
| 7,043,091 B2 * | 5/2006 | Michel | ......................... | 382/266 |
| 7,142,248 B2 * | 11/2006 | Ishii | .............................. | 348/452 |
| 7,154,541 B2 * | 12/2006 | Kondo et al. | .............. | 348/222.1 |
| 7,154,556 B1 * | 12/2006 | Wang et al. | ..................... | 348/452 |
| 7,170,561 B2 * | 1/2007 | Winger et al. | ................. | 348/448 |
| 7,170,562 B2 * | 1/2007 | Yoo et al. | ....................... | 348/452 |
| 7,180,548 B2 * | 2/2007 | Mishima et al. | .............. | 348/441 |
| 7,206,027 B2 * | 4/2007 | De Haan et al. | .............. | 348/448 |
| 7,242,819 B2 * | 7/2007 | Jiang | ............................. | 382/300 |
| 7,245,326 B2 * | 7/2007 | Orlick | .......................... | 348/448 |
| 7,315,331 B2 * | 1/2008 | Franzen | ........................ | 348/452 |
| 7,321,396 B2 * | 1/2008 | Jung et al. | ..................... | 348/452 |
| 7,345,708 B2 * | 3/2008 | Winger et al. | ................ | 348/448 |
| 7,379,626 B2 * | 5/2008 | Lachine et al. | ............... | 382/300 |
| 7,423,691 B2 * | 9/2008 | Orlick et al. | .................. | 348/448 |

(Continued)

*Primary Examiner* — Brian Yenke
(74) *Attorney, Agent, or Firm* — Thomas Horstemeyer, LLP

(57) ABSTRACT

Methods and systems for processing video information are disclosed herein and may comprise calculating at least one vertical gradient of a plurality of adjacent pixels within a current field. A two-field difference may be calculated between a plurality of pixels within a first field and a corresponding plurality of pixels within a second field. At least one pixel may be deinterlaced within the current field based at least in part on the calculated at least one vertical gradient and the calculated two-field difference. The two-field difference may indicate an amount of motion between the plurality of pixels within the first field and the corresponding plurality of pixels within the second field. Phase shifting may be applied to at least one of the plurality of pixels within the first field and the corresponding plurality of pixels within the second field to effect in-phase alignment.

24 Claims, 4 Drawing Sheets

U.S. PATENT DOCUMENTS

| | | | |
|---|---|---|---|
| 7,432,987 B2 * | 10/2008 | Shan et al. | 348/667 |
| 2002/0047919 A1 * | 4/2002 | Kondo et al. | 348/441 |
| 2002/0057362 A1 * | 5/2002 | Wredenhagen et al. | 348/441 |
| 2002/0196362 A1 * | 12/2002 | Yang et al. | 348/452 |
| 2003/0098925 A1 * | 5/2003 | Orlick | 348/448 |
| 2004/0207753 A1 * | 10/2004 | Jung | 348/452 |
| 2005/0073607 A1 * | 4/2005 | Ji et al. | 348/448 |
| 2007/0229534 A1 * | 10/2007 | Kim et al. | 345/606 |

* cited by examiner

SYSTEM AND METHOD FOR VERTICAL GRADIENT DETECTION IN VIDEO PROCESSING

RELATED APPLICATIONS

This application is related to the following applications, each of which is hereby incorporated herein by reference in its entirety for all purposes:

U.S. patent application Ser. No. 11/254,450 filed Oct. 20, 2005;

U.S. patent application Ser. No. 11/254,262 filed Oct. 20, 2005;

U.S. patent application Ser. No. 11/272,116 filed Nov. 10, 2005;

U.S. patent application Ser. No. 11/272,113 filed Nov. 10, 2005;

U.S. patent application Ser. No. 11/272,112 filed Nov. 10, 2005; and

U.S. Provisional Patent Application Ser. No. 60/687,674 filed Jun. 6, 2005.

FIELD OF THE INVENTION

Certain embodiments of the invention relate to processing of video. More specifically, certain embodiments of the invention relate to a system and method for vertical gradient detection in video processing and deinterlacing based at least in part on the detected vertical gradient.

BACKGROUND OF THE INVENTION

During interlacing, pictures that form a video frame may be captured at two distinct time intervals. These pictures, which may be referred to as fields and which form the video frame, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During deinterlacing of interlaced video, a deinterlacing process may generate pictures for display during a single time interval. Deinterlacing by combining content from adjacent fields, which is known as weaving, may be suitable for regions of a picture that are characterized by little or no object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge affect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids weave artifacts in regions with high inter-field motion, spatial interpolation loses vertical detail and may result in a blurry picture.

Conventional methods for deinterlacing interlaced video may produce weave artifacts, for example by incorrectly biasing deinterlacing decisions towards weaving when spatial interpolation may be more appropriate. Similarly, conventional deinterlacing methods may often times bias deinterlacing decisions towards spatial interpolation when weaving may be a more appropriate method for deinterlacing. Furthermore, conventional deinterlacing methods may utilize a determined amount of weaving and spatial interpolation, or "bobbing", which may, however, result in visible artifacts such as contouring artifacts.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for vertical gradient detection in video processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for vertical gradient detection in video processing. In one embodiment of the invention, video information may be processed by calculating an estimate of a vertical gradient of a plurality of vertically adjacent pixels within a current field. Inter-field motion may be estimated utilizing a measurement of differences between a plurality of fields. For example, a two-field difference may be calculated between a plurality of pixels within the current field and a corresponding plurality of in-phase pixels within an adjacent field. At least one of the plurality of pixels within the current field and the corresponding plurality of pixels within the adjacent field may be phase shifted to effect in-phase alignment, prior to the calculation of the two-field difference. The plurality of pixels within the current field and the corresponding plurality of in-phase pixels within the adjacent field may be filtered, prior to the calculation of the two-field difference. A blend control value may be generated based at least in part on the calculated at least one vertical gradient and the calculated two-field difference. The generated blend control value may be limited to a particular range, and the limiting may be achieved via a look-up table, a scaling function, and/or a clipping function. A current output sample value may be generated, based on the blend control value.

Figure 1:
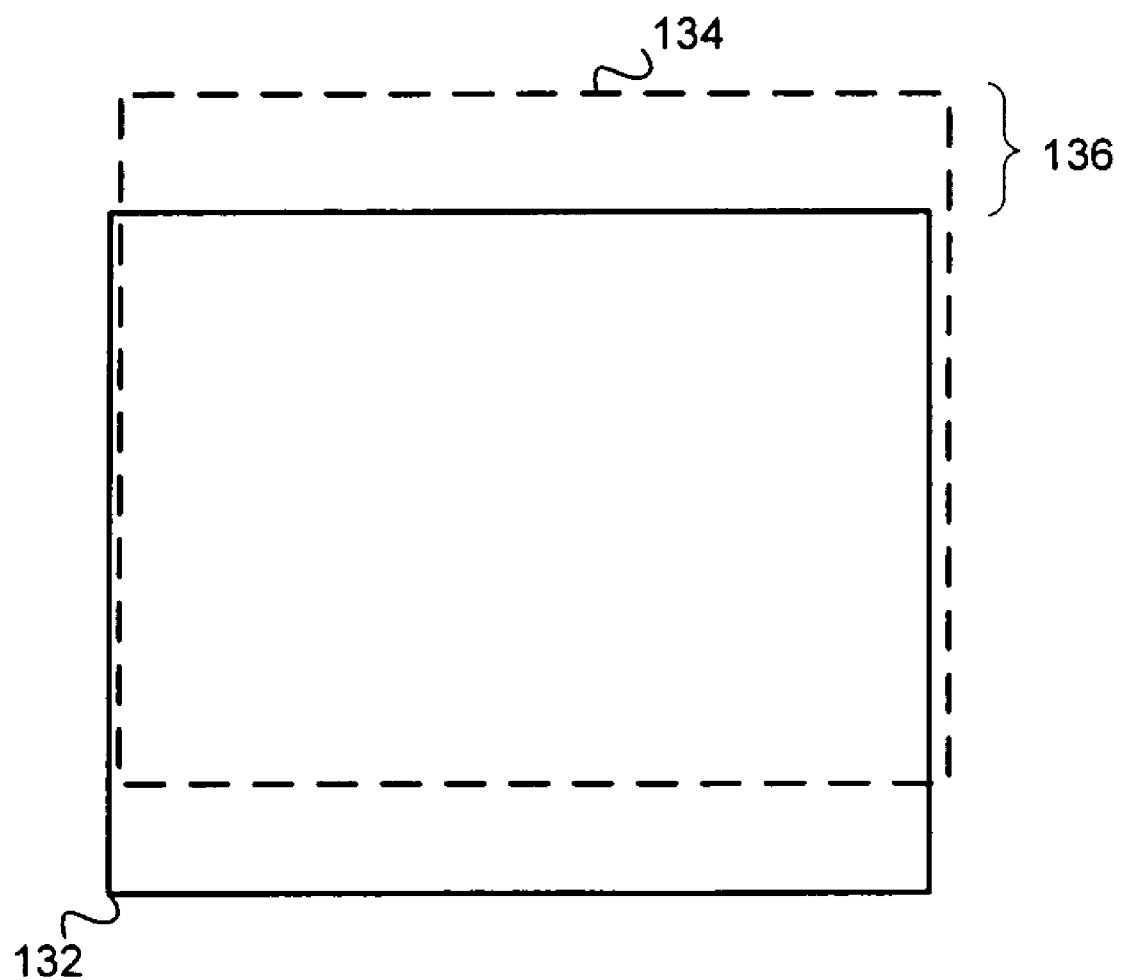
FIG. 1 is a diagram illustrating vertical movement of an object between adjacent fields, in accordance with an embodiment of the invention.

FIG. 1 is a diagram illustrating vertical movement of an object between adjacent fields, in accordance with an embodiment of the invention. Referring to FIG. 1, the rectangular object 132 may have one location in a previous field in an interlaced video signal, for example, and a corresponding image 134 of object 132 may have a different location in a current field in the interlaced video signal. In this regard, object 134 in the current video field may correspond to object 132 in the previous field and may be obtained as a result of vertical movement by object 132 between the previous field and the current field. Area 136 may be representative of bad weave artifacts when vertical motion of pixels is present between adjacent fields of the interlaced video feed. Horizontal or near horizontal edges of a moving object, as illustrated in FIG. 1, may form distorted edges if adjacent fields are weaved. The distorted edges may have the appearance of alternating light and dark horizontal lines, for example.

In one embodiment of the invention, one or more measures of motion of video content may be calculated and combined to generate a combined measure of visible motion of pixels. The combined measure may be utilized to determine whether weaving, spatial interpolation, or a mixture thereof, may be used for deinterlacing. For example, the combined measure may comprise a calculated vertical gradient within a plurality of adjacent pixels in the current field. In addition, the combined measure may also comprise a measure of the motion between fields, such as the vertical motion between the corresponding objects 132 and 134 in the previous and current fields, respectively. The measure of motion between fields may be based on a difference between adjacent fields and may be calculated by utilizing a plurality of corresponding pixels within the adjacent fields.

Figure 2:
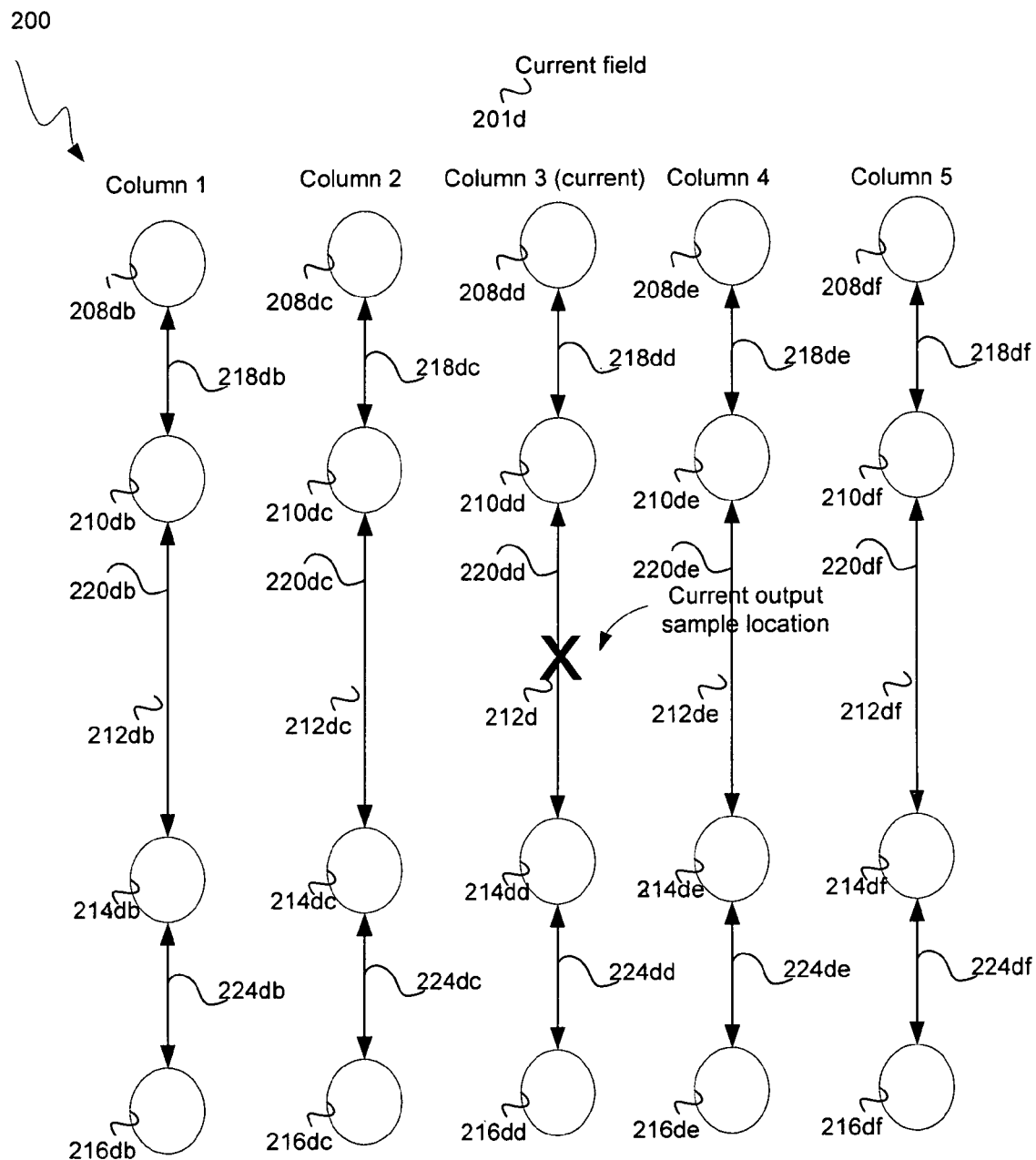
FIG. 2 is a diagram illustrating exemplary selection of pixel samples for vertical gradient detection within a current field, in accordance with an embodiment of the invention.

FIG. 2 is a diagram illustrating exemplary selection of pixel samples for vertical gradient detection within a current field, in accordance with an embodiment of the invention. Referring to FIG. 2, samples 208*dd*, . . . , 216*dd* may be selected for calculation of a vertical gradient centered at the current output sample location 212*d*. The vertical gradient may be utilized as a measure of vertical detail, which can be combined with an inter-field, or two-field difference, for example. In this regard, the vertical gradient may indicate the degree to which horizontal or near horizontal details may exist, which may result in visible bad weave artifacts if the content is moving. Samples 210*dd* and 214*dd* may be selected from the current column in the current field 201*d* so that pixel samples 210*dd* and 214*dd* may be located immediately above and below, respectively, to a current output sample location 212*d* within the current field 201*d*. Pixel samples 208*dd* and 216*dd* may also be selected from the current field 201*d* so that pixel sample 208*dd* may be located immediately above pixel sample 210*dd*, and pixel sample 216*dd* may be located immediately below pixel sample 214*dd*. The pixels samples 208*dd*, . . . , 216*dd* may correspond to the plurality of pixel samples 202*a* from the current field.

Similarly, pixels within the previous columns 1 and 2 and the subsequent columns 3 and 4 within the current field 201*d* may also be selected for calculation of the vertical gradient. For example, pixels 208*db*, . . . , 216*db* may be selected from the previous column 1, and pixels 208*dc*, . . . , 216*dc* may be selected from the previous column 2. Furthermore, pixels 208*de*, . . . , 216*de* may be selected from the subsequent column 4, and pixels 208*df*, . . . , 216*df* may be selected from the subsequent column 5.

Vertical gradient detection may be calculated utilizing, for example, a high pass filter in the vertical dimension. Furthermore, to increase sensitivity in the vertical direction and decrease sensitivity in the horizontal direction, vertical gradient detection may also utilize a low pass filter in the horizontal direction. For example, vertical gradient detection may use as few as two taps vertically, or it may use more taps. The high pass function may comprise a difference function, or it may comprise another type of function. If vertical gradient detection uses 4 taps vertically, the vertical taps may utilize the same coefficient magnitude, such as 1, or they could be weighted. The horizontal low pass function may comprise an average function, or it may comprise another type of function. Vertical gradient detection may also be used to detect presence and magnitude of a vertical gradient by utilizing an absolute value function, such as "abs( )," for example.

In one embodiment of the invention, a vertical gradient may be calculated utilizing all 20 samples illustrated in FIG. 2. In this regard, the vertical taps of the pixels in FIG. 2 may be weighted by coefficients (1, 2, −2, −1), for example, and the horizontal taps may be weighted by coefficients (1, 2, 2, 2, 1), for example. The present invention may not be limited by the number of horizontal and vertical taps, or by the coefficients used for weighting. A plurality of other coefficient values may be utilized with a different number of horizontal and/or vertical taps.

Referring to FIG. 2, a weighted sum of the values of pixels 208*dd*, 210*dd*, 214*dd* and 216*dd* may be calculated for purposes of determining vertical gradient centered at the current output sample location 212*d*. The weighting may be performed by multiplying each of the pixel values by a respective coefficient (1, 2, −2, −1). For example, the sum may be 1*208*d*+2*210*d*−2*214*d*−1*216*d*. The weighted sum may be referred to as sum_y_d, for example. The pixel value used for this calculation may be a luma component of each pixel, or alternatively it may be a chroma component of each pixel, such as Cb or Cr. A similar weighted sum for each of a plurality of horizontally adjacent columns of pixels, such as the pixels in columns 1, 2, 4 and 5 may be calculated. For example, pixels 208*db*, . . . , 216*db* may be selected from the previous column 1, pixels 208*dc*, . . . , 216*dc* may be selected from the previous column 2, pixels 208*de*, . . . , 216*de* may be selected from the subsequent column 4, and pixels 208*df*, . . . , 216*df* may be selected from the subsequent column 5.

In this regard, a weighted sum, such as sum_y_b, may be calculated for column 1, similarly to sum_y_d but utilizing samples (208*db*, . . . , 216*db*). Similarly, weighted sum sum_y_c may be calculated utilizing samples (208*dc*, . . . , 216*dc*) in column 2. Weighted sum sum_y_e may be calculated utilizing samples (208*de*, . . . , 216*de*) in column 4, and weighted sum sum_y_f may be calculated utilizing samples (208*df*, . . . , 216*df*) in column 4. A weighted sum of these five weighted sums may then be calculated utilizing coefficients (1, 2, 2, 2, 1) as sum_y_total=1*sum_y_b+2*sum_y_c+2*sum_y_d+2*sum_y_e+1*sum_y_f. The resulting weighted sum sum_y_total may represent a vertical gradient centered at the current output sample location 212*d*, measuring the component, for example luma, used in the foregoing calculations. In another embodiment of the invention, additional vertical gradient values may be calculated similarly measuring other components of the pixels, for example Cb or Cr. For example, sum_Cb_total may be calculated in a similar fashion to sum_y_total, however using the Cb component of the respective pixels in the calculations. Similarly, for example sum_Cr_total may be calculated in a similar fashion to sum_y_total, however using the Cr component of the respective pixels in the calculations.

In another embodiment of the invention, the absolute value of sum_y_total may be calculated. The resulting value may be referred to as vert_grad_y, for example, and may be utilized as an estimate of the vertical luma gradient in the vicinity of the current output sample location. The value of vert_grad_y may be utilized to estimate the presence of horizontal, or near-horizontal, edges in the content in the current field 201*d*. The value of vert_grad_y may also be utilized to control the calculation of a blending control as part of a de-interlacing method or system, in accordance with an embodiment of the invention.

Alternatively, the absolute values of the sum_Cb_total and sum_Cr_total may also be calculated, and the resulting values may be referred to as vert_grad_Cb and vert_grad_Cr, respectively. The values of vert_grad_Cb and vert_grad_Cr may be utilized as estimates of the vertical Cb gradient and the vertical Cr gradient, respectively. A weighted sum of vert_grad_y, vert_grad_Cb and vert_grad_Cr, for example, may be calculated. The resulting sum may be referred to as vert_grad_total, for example. The value of ver_grad_total may be utilized to control the calculation of a blending control, for example, as part of a de-interlacing method or system, in accordance with an embodiment of the invention.

A vertical gradient may be indicative of horizontal or near horizontal details in the video content, and bad weave artifacts may result from applying weaving to such details if the content is moving between adjacent fields. A high vertical gradient value combined with an indication of motion between fields may result in utilizing spatial interpolation as a method for de interlacing interlaced video fields from the current field and at least one adjacent field. Similarly, a low gradient value may be indicative of a lack of horizontal or near horizontal details such that visible bad weave artifacts are less likely to result from motion between fields and, therefore, weaving may be selected as a method for deinterlacing interlaced video fields from the current field 201*d* and at least one adjacent field.

Figure 3:
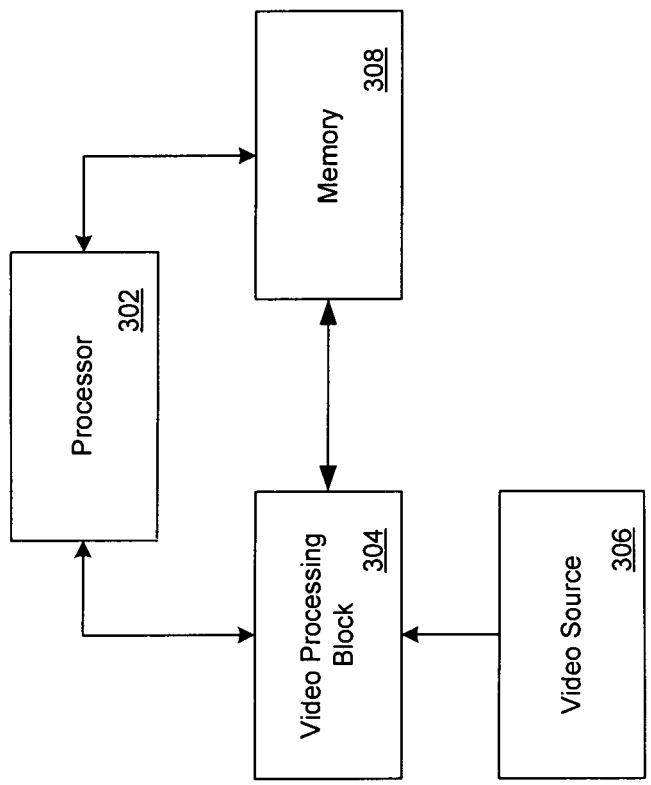
FIG. 3 is a block diagram of an exemplary system for deinterlacing utilizing vertical gradient detection within a current field, in accordance with an embodiment of the invention.

FIG. 3 is a block diagram of an exemplary system for deinterlacing utilizing vertical gradient detection within a current field, in accordance with an embodiment of the invention Referring to FIG. 3, the exemplary system 300 may comprise a processor 302, a video processing block 304, memory 308, and a video source 306. The video source 306 may comprise suitable circuitry, logic, and/or code and may be adapted to communicate raw video stream data, for example, to the video processing block 304. The video processing block 304 may comprise suitable circuitry, logic, and/or code and may be adapted to process the raw video data received from the video source 306. For example, the video processing block 304 may be adapted to deinterlace interlaced video data received from the video source 306 using vertical gradient detection. In this regard, the video processing block 304 may be implemented as a specialized video processing chip, or alternatively as a specialized function within a chip that comprises other functions.

The processor 302 may comprise suitable circuitry, logic, and/or code and may be adapted to control processing of video information by the video processing block 304, for example. The processor 302 may comprise a system or a host processor, or a video processor such as a video processing chip or embedded video processor core. The video processor may be integrated in any device that may be utilized to generate video signals and/or display video. The memory 308 may be adapted to store raw or processed video data, such as video data processed by the video processing block 304. Furthermore, the memory 308 may be utilized to store code that may be executed by the processor 302 in connection with video processing tasks performed by the video processing block 304. For example, the memory 308 may store code that may be utilized by the processor 302 and the video processing block 304 for calculating a vertical gradient within a current field, and utilizing the calculated vertical gradient during deinterlacing of interlaced video received from the video source 306.

The processor 302 may be adapted to calculate at least one vertical gradient within a plurality of vertically adjacent pixels within a current field. The plurality of pixels may be received from the video source 306. The processor 302 may deinterlace at least one pixel within the current field based at least in part on the calculated at least one vertical gradient.

Figure 4:
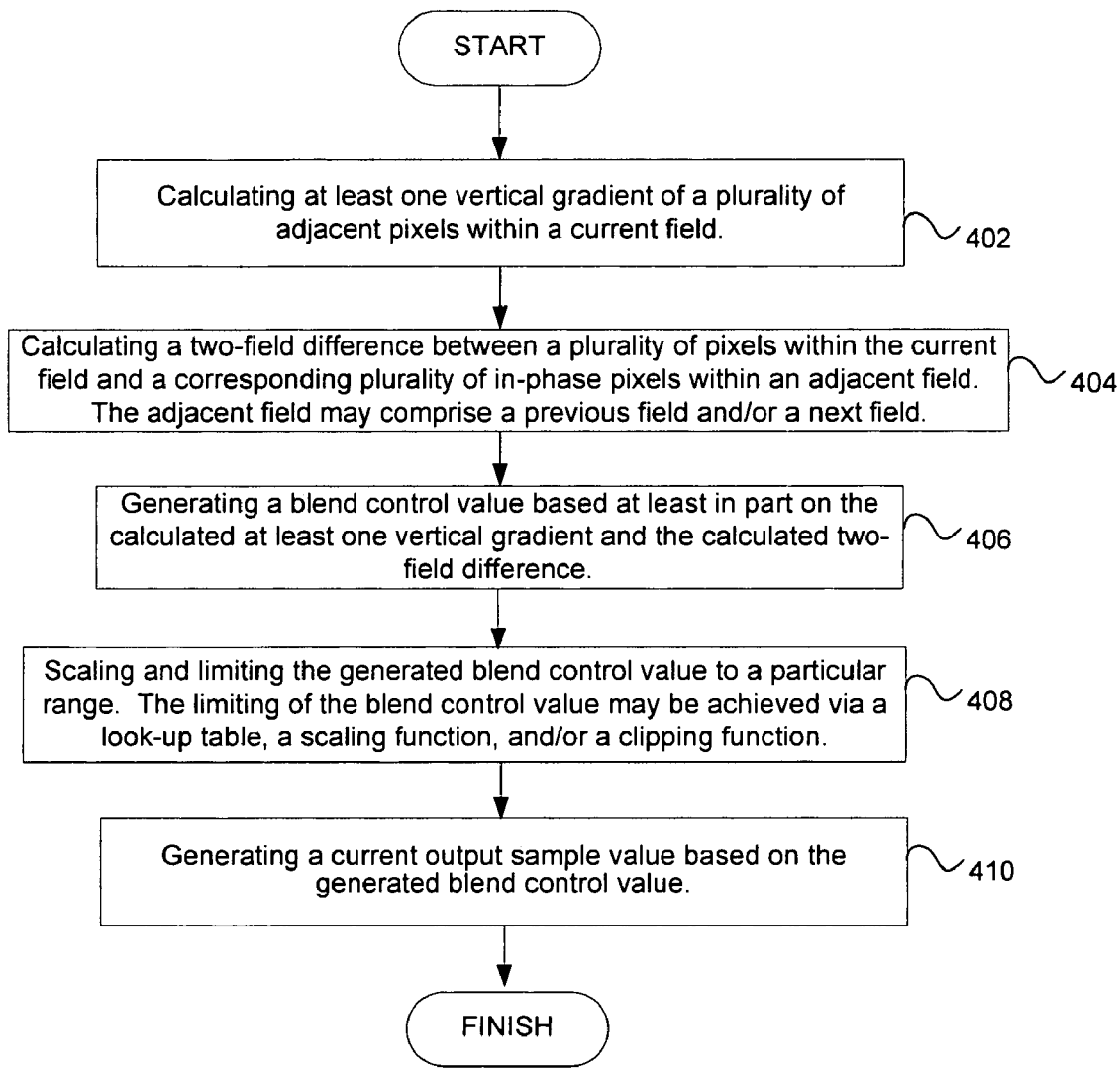
FIG. 4 is a flow diagram illustrating exemplary steps for processing video information, in accordance with an embodiment of the invention.

FIG. 4 is a flow diagram illustrating exemplary steps for processing video information, in accordance with an embodiment of the invention. Referring to FIGS. 2 and 4, at 402, at least one vertical gradient of a plurality of adjacent pixels within a current field 201*d* may be calculated. At 404, a two-field difference may be calculated between a plurality of pixels within the current field 201*d* and a corresponding plurality of in-phase pixels within an adjacent field. The adjacent field may comprise a previous field and/or a next field. At 406, a blend control value may be generated based at least in part on the calculated at least one vertical gradient and the calculated two-field difference. At 408, the generated blend control value may be scaled and limited to a particular range. The limiting of the blend control value may be achieved via a look-up table, a scaling function, and/or a clipping function. At 410, a current output sample value may be generated based on the generated blend control value. Alternatively, in step 404 a difference between a plurality of fields may be calculated between a plurality of pixels within the current field 201*d* and a corresponding plurality of in-phase pixels within at least one other field, such as a preceding field of the same polarity, for example, or a following field of the same polarity, for example. Alternatively, in step 404 a difference between a plurality of fields may be calculated between a plurality of pixels within a previous field and a corresponding plurality of in-phase pixels within a following field, for example.

Accordingly, aspects of the invention may be realized in hardware, software, firmware, or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may typically be determined primarily by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video information, the method comprising:
    calculating at least one vertical gradient of a plurality of adjacent pixels within a current field;
    calculating a two-field difference between a plurality of pixels within a first field and a corresponding plurality of pixels within a second field; and
    deinterlacing at least one pixel within said current field based at least in part on said calculated at least one vertical gradient and said calculated two-field difference.

2. The method according to claim 1, wherein said two-field difference indicates an amount of motion between said plurality of pixels within said first field and said corresponding plurality of pixels within said second field.

3. The method according to claim 1, wherein said first field comprises said current field.

4. The method according to claim 1, wherein said second field comprises one or both of a previous field adjacent to said current field and/or a next field adjacent to said current field.

5. The method according to claim 1, comprising filtering said plurality of pixels within said first field and said corresponding plurality of pixels within said second field, prior to said calculation of said two-field difference.

6. The method according to claim 1, comprising phase shifting at least one of said plurality of pixels within said first field and said corresponding plurality of pixels within said second field to effect in-phase alignment prior to said calculation of said two-field difference.

7. The method according to claim 1, wherein said plurality of adjacent pixels comprises one or both of a plurality of vertically adjacent pixels and/or a plurality of pixels adjacent to said plurality of vertically adjacent pixels.

8. The method according to claim 1, wherein said plurality of adjacent pixels comprise at least one chrominance component.

9. The method according to claim 1, comprising generating a blend control value based at least in part on said calculated at least one vertical gradient and said calculated two-field difference.

10. The method according to claim 9, comprising limiting said generated blend control value to a particular range.

11. The method according to claim 10, wherein said limiting of said blend control value is achieved via one or more of a look-up table, a scaling function, and/or a clipping function.

12. The method according to claim 9, comprising generating a current output sample value, based at least in part on said generated blend control value.

13. A system for processing video information, the system comprising:
    at least one processor that enables calculation of at least one vertical gradient of a plurality of adjacent pixels within a current field;
    said at least one processor enables calculation of a two-field difference between a plurality of pixels within a first field and a corresponding plurality of pixels within a second field; and
    said at least one processor enables deinterlacing of at least one pixel within said current field based at least in part on said calculated at least one vertical gradient and said calculated two-field difference.

14. The system according to claim 13, wherein said two-field difference indicates an amount of motion between said plurality of pixels within said first field and said corresponding plurality of pixels within said second field.

15. The system according to claim 13, wherein said first field comprises the said current field.

16. The system according to claim 13, wherein said second field comprises one or both of a previous field adjacent to said first field and/or a next field adjacent to said current field.

17. The system according to claim 13, wherein said at least one processor enables filtering of said plurality of pixels within said first field and said corresponding plurality of pixels within said second field, prior to said calculation of said two-field difference.

18. The system according to claim 13, wherein said at least one processor enables phase shifting of at least one of said plurality of pixels within said first field and said corresponding plurality of pixels within said second field to effect in-phase alignment, prior to said calculation of said two-field difference.

19. The system according to claim 13, wherein said plurality of adjacent pixels comprises one or both of a plurality of vertically adjacent pixels and/or a plurality of pixels adjacent to said plurality of vertically adjacent pixels.

20. The system according to claim 13, wherein said plurality of adjacent pixels comprise at least one chrominance component.

21. The system according to claim 13, wherein said at least one processor enables generation of a blend control value based at least in part on said calculated at least one vertical gradient and said calculated two-field difference.

22. The system according to claim 21, wherein said at least one processor enables limiting of said generated blend control value to a particular range.

23. The system according to claim 22, wherein said limiting of said blend control value is achieved via one or more of a look-up table, a scaling function, and/or a clipping function.

24. The system according to claim 21 comprising generating a current output sample value, based at least in part on said generated blend control value.

* * * * *